Dec. 5, 1961 H. M. FERGUSON 3,012,224
ANGLE OF APPROACH INDICATORS FOR AIRCRAFT LANDINGS
Filed Feb. 18, 1959
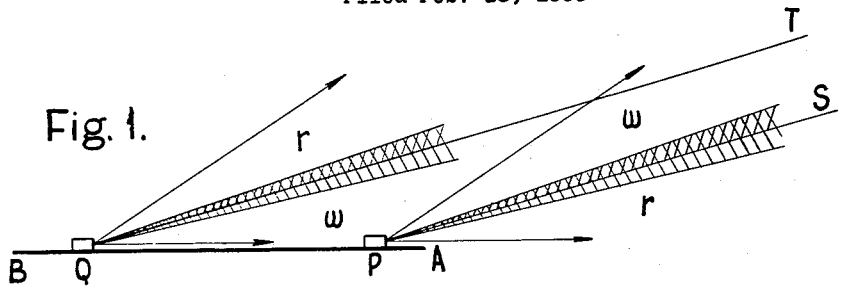
Fig. 1.
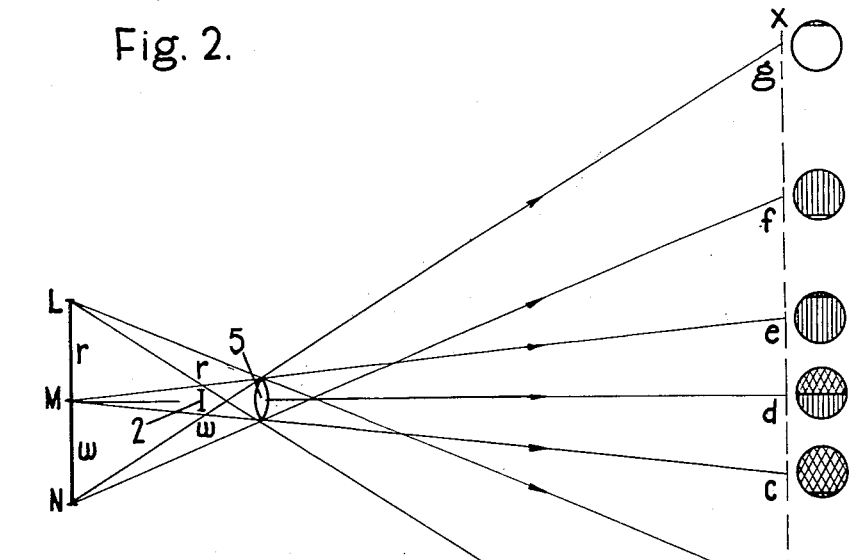
Fig. 2.
Fig. 3.
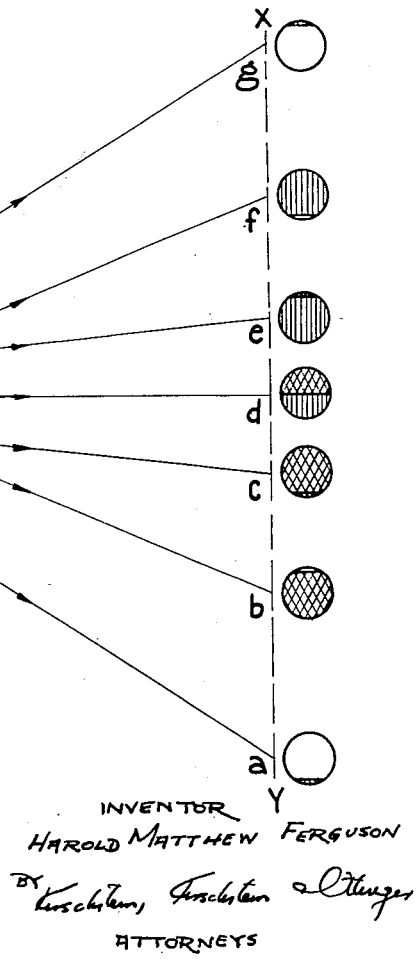
INVENTOR
HAROLD MATTHEW FERGUSON
BY Kirschstein, Kirschstein & Ottinger
ATTORNEYS

# United States Patent Office 3,012,224
Patented Dec. 5, 1961

3,012,224
ANGLE OF APPROACH INDICATORS FOR AIRCRAFT LANDINGS
Harold Matthew Ferguson, Hatch End, England, assignor to The General Electric Company Limited, London, England
Filed Feb. 18, 1959, Ser. No. 794,046
Claims priority, application Great Britain Feb. 28, 1958
4 Claims. (Cl. 340—26)

This invention relates to optical indicators for guiding aircraft along the correct angle of descent towards a runway for landing of the aircraft on the runway.

It has been proposed for this purpose to use two optical projectors spaced apart along the length of the runway and each arranged to project light beams having upper and lower parts of different colours the dividing plane between which is directed upwards at or near the required angle of descent for the aircraft. The pilot of the aircraft then directs his approach so that the aircraft lies in the zone of overlap between the upper part of the first beam (i.e. from the projector nearer the aircraft) and the lower part of the second beam, as indicated by the corresponding colourations of the two projectors.

A two-light system of this kind has the advantage over a single light system, in which an optical projector directs towards the approaching aircraft a single beam having three colours in vertical section such that the pilot is intended to maintain his approach path in the central coloured part of the beam, in that the single light system provides only a single aiming point on the runway and the pilot receives an "off-course" indication which he has to ignore as he levels out the aircraft for touch down on the runway; with the two-light system the pilot has more tolerance in his approach and can level out without receiving an unduly early "off-course" indication.

In one form of two-light system which has been proposed each projector is arranged to emit a light beam having a white upper part and red lower part, so that if the approaching pilot sees both lights coloured red he knows that he is too low; if both lights are coloured white he knows that he is too high, and his object is to direct the aircraft so that one light appears white and the other red.

In another proposed form of two-light system the first projector is arranged to emit a light beam having an upper green part and lower red part and the second projector is arranged to emit a light beam having an upper red part and a lower green part. The pilot's task is then to direct his aircraft so that both lights appear green and the appearance of the lights in different colours indicates that he is too high or too low, according to the order of the colours.

In these systems it has been regarded as highly desirable that the division between the two parts of each beam should be as sharp as possible and the inevitable angle of confusion of the two colours at the division, resulting from optical imperfections, has been regarded as a disadvantage to be minimised as far as possible.

We have now appreciated that this disadvantage can be turned to an advantage for providing further information to the pilot and facilitating his approach and landing, as will be explained.

According to the present invention an optical indicating system for guiding aircraft along the correct angle of descent towards a runway for landing of the aircraft on the runway comprises a combination of two optical projectors spaced apart along the length of the runway and each arranged to project a light beam having upper and lower parts of different colours and having an angle of perceptible confusion of the two colours of at least one degree, the central plane of each angle of perceptible confusion is directed upwards at or near the required angle of descent for the aircraft, and the colour of the upper part of each light beam is the same as the colour of the lower part of the other light beam.

The angle of perceptible confusion of the two colours in each beam means the vertical angle within which a change of the one colour due to an admixture of the other is perceptible to the eye when viewed side by side with light of the original colour. This angle of perceptible confusion will in most cases be appreciably less than the total angle of confusion within which there is in fact some mixing of the colours, since a slight admixture of one colour is usually swamped by the other colour and the admixture does not become perceptible until it has reached an appreciable proportion of the total light, which will in general vary with the colours used and with the geometry of the system. Hereafter the term "angle of confusion" will mean the angle of perceptible confusion unless otherwise stated. The central plane of each angle of confusion is, of course, the plane which bisects the angle of confusion in vertical sections.

With the system in accordance with the invention the task of the pilot is to guide his aircraft so that he always sees the two lights in the same colour, and where, as is preferred, the first beam is coloured white in its upper part and red in its lower part (the second beam being red in its upper part and white in its lower part), the signal to the pilot that he is too high is that the apparent upper of the two lights which he sees is coloured red, and conversely the signal that he is too low is that the apparent lower of the two lights which he sees is red (the other light being white in each case), so that the guiding rule for the pilot is "keep away from the red," which is quickly appreciated.

The advantages obtainable with the invention, which will be explained in connection with a particular embodiment of it, result from the deliberate introduction within the light beams of relatively large angles of confusion of the two colours, and for obtaining a suitable control of the angle of confusion each optical projector preferably includes a two-colour filter, a condenser system for illuminating the filter, and a lens system for projecting the light from the filter as a narrow beam, the filter being arranged so far within the focus of the lens system that the angle of confusion at the junction of the two colours in the projected beam is not less than one degree.

The invention will now be further described, and the advantages obtainable with it explained, in connection with the accompanying drawings, in which FIGURE 1 shows a side elevation of one embodiment of the invention, FIGURE 2 indicates the nature of the optical projectors used in this embodiment, and FIGURE 3 is explanatory of the operation of the projectors. It will be appreciated that the drawings are purely schematic.

Referring now to FIGURE 1, AB represents a runway on which are arranged two optical projectors P and Q spaced apart at a distance of, say, 1,000 feet. Each is arranged to project upwards a beam of light of vertical angle about 6°, of which that produced by P is coloured white in the upper part and red in the lower part, whilst that produced by Q is coloured red in the upper part and white in the lower part, as indicated by the letters $r$ and $w$ respectively.

The lower edge of each beam is substantially horizontal and each is formed with an angle of confusion at the junction of the two colours, as indicated by the shading, of not less than 1°. The centre planes PS and QT of the two angles of confusion are directed at angles of 3° to the horizontal and define between them the region within which the pilot must bring his aircraft.

The advantages obtainable with such an arrangement are two-fold and related firstly to the position of the aircraft at a considerable distance from the airfield, and secondly to the position close to the runway.

Consider first the aircraft at a distance of, say three or four miles from the airfield. At this distance the upper part of the angle of confusion in the light beam from P will have merged with the lower part of the angle of confusion in the light beam from Q in the region between the planes PS and QT in which the pilot is required to bring his aircraft. The pilot will readily be able to bring his aircraft within this region since outside it he will see one light red and the other white, the lights appearing one above the other, and the application of the rule "move away from the red" will bring his aircraft from above or below into the region.

Within this region he will see each of the lights at P and Q with some admixture of red, which admixture will be the greater for the P light and the less for the Q light the nearer he is to the plane PS, and conversely will be the less for the P light and the greater for the Q light the nearer he is to the plane QT. The admixture of red will be the same for both lights when he is exactly midway between the two planes.

Thus the pilot will see both lights in the same colour when he is accurately "on course" midway between the two planes, which colour will be a somewhat pinkish white if he is very distant from the airfield. In either case a movement towards one or other of the planes PS or QT will result in the corresponding light P or Q acquiring a progressively deeper red tinge whilst the other light becomes more white, and this will readily be apparent since the two lights, which appear close to each other in the pilot's field of view, act as comparators for each other and the eye can readily perceive small colour differences between adjacent light sources.

The pilot will thus receive a very sensitive and smoothly changing indication as to the direction and rate at which he is moving towards or away from the correct approach path within the region between the planes QT and PS, which will greatly facilitate his finding and maintenance of the correct path. It will be seen that the pilot's task for correct approach is to maintain both lights in the same colour and to keep away from the red light if there should be any colour change.

This sensitive indication is provided until the pilot reaches the point before the runway at which the lower edge of the angle of confusion in the light beam from Q is spacially separated from the upper edge of the angle of confusion in the light beam from P. This will occur at a distance of about 2,500 feet in front of P with the light spacings and beam angles mentioned in connection with FIGURE 1.

The pilot then passes into a zone where his "on course" indication is two white lights and in which his vertical position can change by a progressively increasing amount without altering the colour of either light as he approaches the runway. This increasing tolerance is desirable to enable the pilot to make the final approach and level-off for touch down without running through an unduly early off-course indication, and in this respect has the same advantage as the known two-light systems. The arrangement in accordance with the invention has, however, the further advantage that if, when approaching the runway in this zone, the pilot is at the upper or lower end of the vertical range of tolerance, this will be indicated by a relatively red appearance of the corresponding upper (Q) or lower (P) of the two lights, providing a quickly recognisable indication of his height above the runway, which is valuable information at this stage of approach. Moreover a progressively deepening red colour of the relatively red light, readily perceptible by comparison with the other, white, light, will indicate to the pilot that he is moving away from a path of the correct angle of descent, at a rate indicated by the rate of deepening of the red colour, and will enable him to take any necessary recovering action without unduly restricting his exact aiming point in the last stages of approach.

It will be appreciated that the sensitivity of the differential indication provided in the early stages of approach and the distance before the runway at which the vertical height tolerance becomes effective can be controlled by controlling the beam angles, including the angles of confusion, and/or by tilting the planes PS and QT to each other.

Turning now to FIGURE 2, this illustrates schematically the details of a preferred form of optical projector for use in accordance with the invention. This projector comprises a condenser system, illustrated as an elliptical reflector 1, arranged to flood a two-colour filter 2 with light from an electric lamp 3.

The filter 2, having a red upper half $r$ and white lower half $w$, is arranged just within the focus 4 of a projection lens system 5 which forms the light from the filter into a narrow beam producing a virtual image of the filter, the beam being coloured red in its lower half and white in its upper half, with an angle of confusion of the two colours indicated by the shading, the value of which can be controlled by the spacing of the filter 2 from the focus 4.

The other projector can be similar with the filter reversed to have a white upper half and red lower half.

FIGURE 3 illustrates in more detail the appearance of the beam of light formed by the lens system and the nature of the angle of confusion.

In the figure the lens system is represented by the single lens 5 and the virtual image of the filter 2 is represented by the line IMN, the part IM being red ($r$) and the part MN being white ($w$).

An observer in the plane XY to the right in the figure will see the beam produced by the lens system as though looking through a window of the size of the lens aperture at the virtual image LMN. Thus, as indicated by the circles to the right of the plane XY showing the appearance of the lens aperture, at the position $a$ an observer will see the top edge L of the image at the bottom of the aperture, and as the observer moves upwards, the top edge will travel upwards across the aperture, with extending red colouration of the illuminated area, as indicated by the cross-hatching, until at $b$ all the aperture appears coloured red. This condition persists until $c$ is reached, at which the dividing line M appears at the bottom of the aperture.

With further upward movement of the observer the line M appears to move upwards and an increasing white colouration, indicated by the single line shading, spreads across the aperture, through point $d$ at which the aperture is half white and half red, to point $e$ at which the line M appears to pass upwards out of view and the whole of the aperture is illuminated white.

This condition persists until point $f$ is reached at which the lowed edge N of the filter becomes visible and appears to travel upwards across the aperture, with diminution of the white coloured illuminated area, until point $g$ is reached, after which the aperture appears unilluminated.

The main beam angle, within which full aperture illumination is obtained, thus embraces the region $bf$ and the total angle of confusion between the colours embraces the region $ce$. These angles can be controlled by the constants of the lens system 5 and the displacement of the filter 2 from its focus.

The perceptible angle of confusion will be considerably less than the total angle of confusion, probably by a factor of about a half, depending on the exact colours of the two lights and the shape of the lens aperture, which need not necessarily be circular.

In general it will be desirable for the light beams to be of relatively wide angle in horizontal planes, so that the beams are of fan shape, and this can be effected by including a light spreading element (not shown) such as a refractor plate carrying vertical prisms, in front of each lens 5.

I claim:

1. An optical indicating system for guiding aircraft along a correct angle of descent towards a runway for landing of the aircraft on the runway, said system comprising two optical projectors spaced apart one behind the other along the length of the runway, each projector including a light source, means for concentrating light from said source into a vertically narrow beam, and beam coloring means having a single horizontal color dividing edge interposed in the light path to divide the beam into differently colored upper and lower parts with an angle of perceptible color confusion of the two parts of at least one degree in a vertical plane, each projector being oriented to direct its light beam along the length of the runway towards the approaching aircraft with the central plane of the angle of perceptible color confusion directed upwards at an angle suitable for descent of the aircraft, and the color of the upper part of each light beam being the same as the color of the lower part of the other light beam.

2. An optical indicating system according to claim 1 wherein each optical projector comprises a projection lens system, a beam coloring filter arranged between the lens system and its focus, a light source, and a condenser for flooding the filter with light from the light source, the filter having differently coloured upper and lower parts and being displaced a minimum distance from the lens focus towards the lens to give an angle of perceptible confusion between the two colours of at least one degree in the beam of light projected by the lens system.

3. An optical indicating system according to claim 2 wherein for each projector the total vertical angle of the beam of light produced is about 6°, the perceptible angle of confusion is about 1.5°, and the distance apart of the projectors along the length of the runway is about 1000 feet.

4. An optical indicating system according to claim 1 wherein the light source and beam coloring means in the first projector produce a light beam colored white in its upper part and red in its lower part, and the light source and beam coloring means in the second projector produce a light beam colored red in its upper part and white in its lower part, the said first projector being located nearer to the end of the runway directed towards the aircraft than is the said second projector.

References Cited in the file of this patent

UNITED STATES PATENTS

| | | |
|---|---|---|
| 2,441,877 | Flett | May 18, 1948 |
| 2,498,294 | Pennow | Feb. 21, 1950 |
| 2,597,321 | Hergenrother | May 20, 1952 |
| 2,669,703 | Hammond | Feb. 16, 1954 |